Patented Oct. 30, 1928.

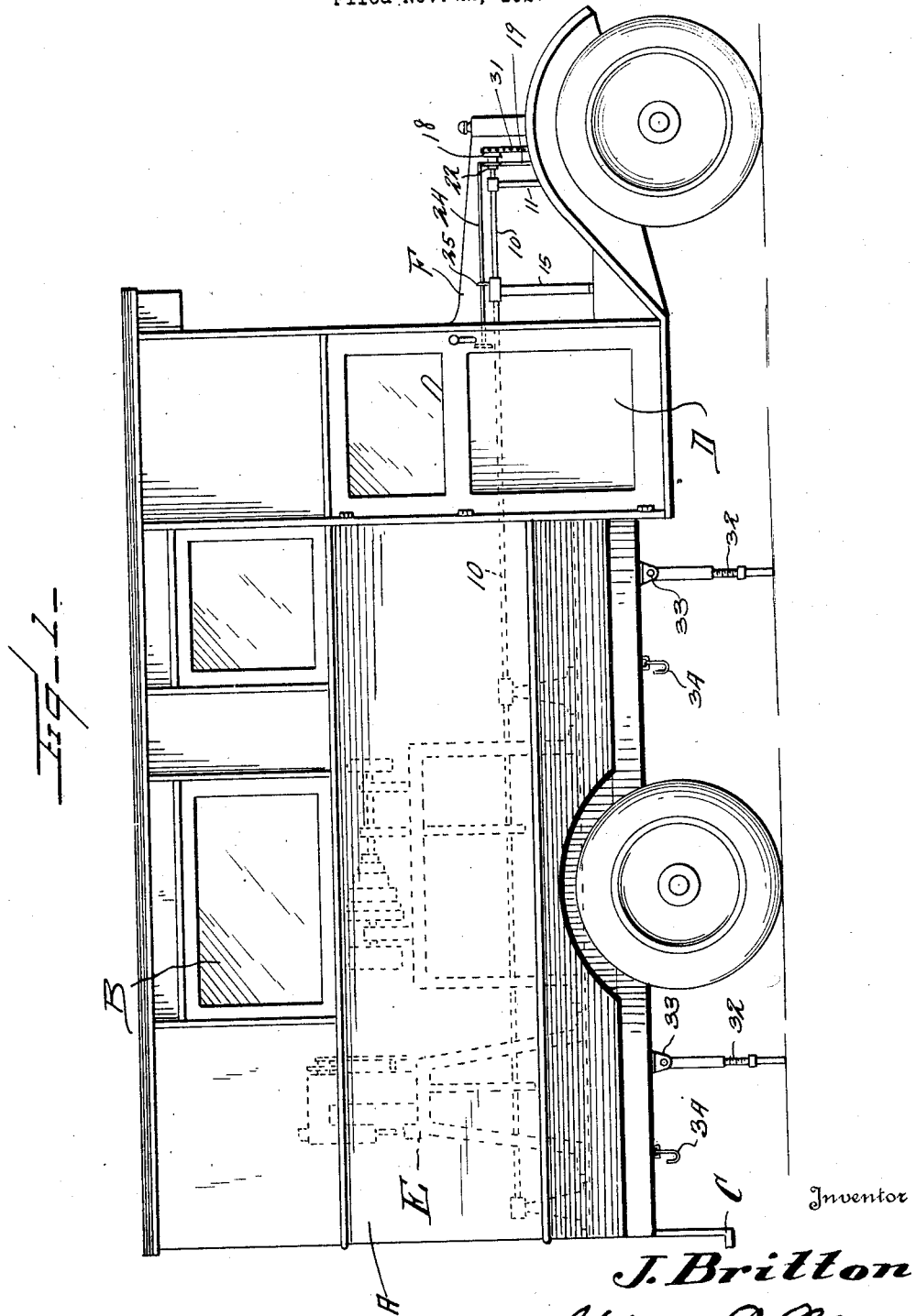

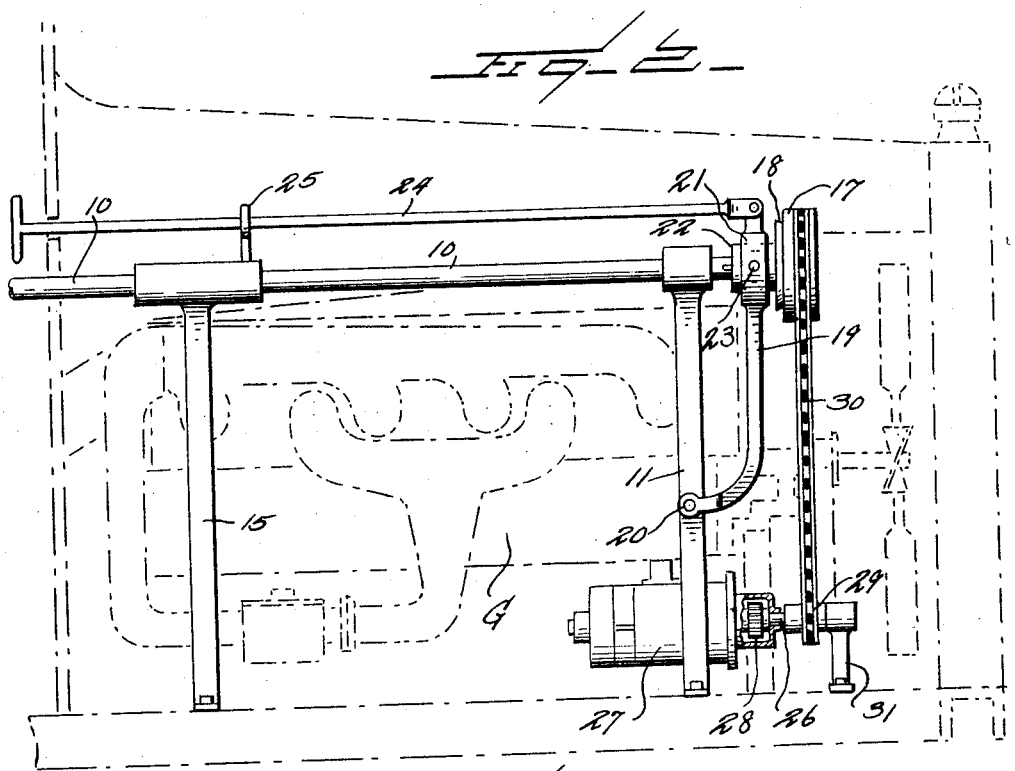

1,689,771

UNITED STATES PATENT OFFICE.

JIM BRITTON, OF BESSEMER, ALABAMA.

PORTABLE SHOE SHOP.

Application filed November 22, 1927. Serial No. 235,030.

This invention relates to portable work shops and particularly to a portable shoe repairing shop designed to travel around the country from place to place and particularly designed to travel through towns and villages where there are no repair shops and no sources of power.

The general object of the present invention is to provide an automobile truck having therein a shoe repairing or other mechanism and provided with means whereby the mechanism may be operated, the truck, of course, being provided with its own motor.

A further object is to provide a mechanism of this character which includes an electric generator driven by the engine, a line shaft which drives the shoe repairing mechanism, and means for operatively connecting the line shaft to the generator to be driven thereby or disconnected from the generator.

Other objects will appear in the course of the following description.

My invention is illustrated in the accompanying drawings wherein:—

Figure 1 is a side elevation of an automobile repair shop constructed in accordance with my invention;

Figure 2 is a side elevation of the driving mechanism for the machines, the internal combustion engine of the automobile and the hood being shown in dotted lines and the generator being partially broken away;

Figure 3 is a section through the line shaft and the channel iron of the frame showing the support for the line shaft in elevation;

Figure 4 is an end view of the shipper lever for the clutch, and

Figure 5 is a plan view of the shipper lever rod.

In the drawings, A designates the automobile truck generally which is provided with slidable windows B and with the rear step C. The driving mechanism of the automobile is controlled from the cab which is entered by the door D. E designates generally the shoe repairing machines which are to be driven and F the hood of the automobile, G designating the engine of the automobile. In these drawings 10 designates a line shaft which extends longitudinally through the car from a point to one side of the hood to any desired point within the car and which is supported on bearings 11 and 15 of any suitable character. The bearing 11 is shown as being provided at its upper end with the bearing sleeve 12 and at its lower end with the flange 13 which is bolted to the longitudinal frame beam 14 of the chassis. The bearing member 15 is of like construction and like bearing members are disposed within the interior of the automobile. Preferably the brackets and bearing members 11 and 15 are provided with outwardly projecting arms 16 which are attached in any suitable manner to the engine block or to the hood of the automobile or any other part which will form a sufficient support for the bracket.

The line shaft 10 carries upon it the line pulley or sprocket wheel 17 and coacting with this sprocket wheel is a clutch member 18 slidably mounted upon the shaft 10 for rotation therewith. This clutch member is shifted by means of the shipper member 19 having the ring 20 which is pivoted at 20 upon the bracket or support 11 which is provided with the annulus 20 having pins 23 engaging the hub 22 of the clutch member 18. The upper end of this shipper lever is pivoted to a rod 24 which extends through a guide eye 25 carried upon the bracket 15 and which extends through the dash board of the machine into the interior of the work shop. It may extend into this work shop to any desired extent or may terminate within the cab if desired.

Mounted upon the frame of the machine in any suitable manner is the usual generator 27 which is driven from the engine in the usual manner but is shown as having a relatively long shaft 26 carrying a gear wheel 28 whereby power is transferred to it by the engine and also carrying upon it the sprocket wheel 29. A sprocket chain 30 engages the sprocket wheel 29 with the sprocket wheel 17, thus transmitting power thereto. The shaft 26 is supported at its end by the bearing 31. The generator 27 is to be connected up in the usual manner to perform its usual function but by connecting the generator shaft to the line shaft 10 and driving the generator from the engine, the engine while it is in use for driving the machinery of the shoe shop may be also used for generating electricity for the necessary lights to illuminate the interior of the shop.

A work shop constructed in accordance with this invention has been found to be extremely convenient and practicable particularly in use in small towns and villages where there are no shoe repairing shops, inasmuch as it permits the operator to drive the car to the door of the customer and repair shoes at the customer's door, thus cutting out the annoyance of having to carry shoes to the repairers and the expense of delivering the repaired shoes.

Preferably the car will be provided with some means whereby the body of the car may be supported and the weight of the car taken off the rear wheels when the car is at rest for any length of time. To this end I may provide the ears 33 and the legs 32 pivoted thereto, these legs being formed in two telescopic or screw-threaded sections as shown in Figure 1 in the nature of jacks whereby the car may be jacked up. These legs may be supported by means of the hooks 34. While I have illustrated a construction which I have found very effective in use, I do not wish to be limited thereto as changes might be made in the details without departing from the spirit of the invention.

I claim:—

1. A portable workshop of the character described comprising a vehicle, a motor for driving the same, a line shaft extending longitudinally through the vehicle and extending parallel to the motor, an electric generator mounted upon the vehicle, means for driving the generator from the motor, and an operative connection between the generator and the line shaft including a driving element loosely mounted upon the line shaft and operatively connected to the generator shaft, a clutch slidably mounted upon the line shaft and rotatable therewith and shiftable into or out of engagement with the driving element, clutch shipping means engaging said clutch and an operating rod operatively connected to the shipper lever and extending longitudinally into the interior of the vehicle.

2. A portable workshop comprising a vehicle, a motor driving the same at the forward end of the vehicle, a line shaft extending longitudinally through the vehicle, and disposed parallel to the motor, bearings supporting the line shaft including the bearing brackets mounted upon the frame of the vehicle at the forward end thereof and having braces engaging the brackets with a portion of the vehicle, a driving element loose upon the line shaft, an electric generator operatively connected to the motor of the vehicle to be driven thereby and including a shaft, driving means from said shaft to the driving element on the line shaft, a clutch shiftable to connect the driving element with the line shaft or disconnect it therefrom, and means extending into the motor vehicle whereby the clutch may be shifted.

In testimony whereof I hereunto affix my signature.

JIM BRITTON.